United States Patent [19]
Goodwin

[11] Patent Number: 5,632,035
[45] Date of Patent: May 20, 1997

[54] PROCESS FOR VERIFYING GDMO TEMPLATE REFERENCES AND FOR PROVIDING AN ORDERED LIST OF GDMO TEMPLATES

[75] Inventor: Jeremy P. Goodwin, Raleigh, N.C.

[73] Assignee: International Business Machines Corporation, Armonk, N.Y.

[21] Appl. No.: 309,224

[22] Filed: Sep. 20, 1994

[51] Int. Cl.⁶ .................... G06F 9/44; G06F 9/45
[52] U.S. Cl. ............................................. 395/705
[58] Field of Search ........................ 395/600, 650, 395/700, 705

[56] References Cited

U.S. PATENT DOCUMENTS

5,257,371 10/1993 Anezaki .................... 395/650
5,291,583 3/1994 Bapat ........................ 395/500
5,414,842 5/1995 Filip et al. ................. 395/200
5,519,868 5/1996 Allen et al. ................ 395/700

Primary Examiner—Kevin A. Kriess
Assistant Examiner—Kakali Chaki
Attorney, Agent, or Firm—Homer L. Knearl; Gerald R. Woods

[57] ABSTRACT

In a compiler for the GDMO language, a verified and ordered output list of GDMO templates is provided by a method that lists each template in the output list such that all listed templates are preceded in the list by templates that are referenced by a listed template.

16 Claims, 7 Drawing Sheets

PROCESS FOR VERIFYING GDMO TEMPLATE REFERENCES AND FOR PROVIDING AN ORDERED LIST OF GDMO TEMPLATES

BACKGROUND OF THE INVENTION

1. Field of the Invention

This invention relates to improvements in a compiler that is used to compile the GDMO language.

2. Description of the Related Art

GDMO (Guidelines for the Definition of Managed Objects) is a known object-oriented design specification language in which a designer uses multiple object class referencing to specify and structure the managed object classes that are being defined by the designer.

The following nine GDMO template types are allowed; Managed Object Class, Package, Parameter, Name Binding, Attribute, Attribute Group, Behavior, Action, and Notification. The GDMO language specifies which of these template types may contain reference to what other template types.

Object classes are defined using these nine different GDMO template types that are allowed by the GDMO language. A Managed Object Class template defines the class by specifying features such as the name of the class, and what other classes this class references. In this manner, a complex class hierarchy of class inheritance can be defined by the designer.

The GDMO language specifies several rules that regulate the allowable structure of such a hierarchy. These rules require that all classes, with the exception of a special class called "top", may reference all other classes, that all classes can inherit either directly of indirectly from "top", and that no cycles can be present in the inheritance hierarchy. For example, if two classes A and B are defined such that A inherits from B, and B inherits from A, a cycle is defined and the GDMO language rule against cycles is violated.

The present invention operates to verify that no GDMO template references any other template for which a definition is not provided in the rules of the GDMO language. The invention then linearizes, or orders, a GDMO template input list by building an output list of the templates using the unique process of the invention.

The present invention operates to detect errors in GDMO definitions at compile time, rather than at execution time as in prior arrangements. This feature of the invention simplifies execution time error handling significantly. Having the templates linearized in the output list, as is provided by the invention, provides significant execution time simplification to all programs that must load and process the complied GDMO definitions contained in the compiled output file.

SUMMARY OF THE INVENTION

This invention relates to a compiler that is written to compile the GDMO language. The invention performs two functions simultaneously, and thereby solves two problems that are associated with the definition of a GDMO hierarchy structure.

The invention first checks the reference structure for correctness; i.e., ensures that the three required GDMO properties of Acyclic, Connected, and Single-source are met by the structure being checked.

Second, the invention provides in an output list a complete ordering or linearization of the input list's templates from the partial order that is contained in an input list and is defined by the referencing hierarchy being checked. This complete ordering includes an ordering of not only the templates, but also includes the ordering of all other types of GDMO templates. This second function allows templates to be later added to a database without compromising the database's integrity. This second function also allows other applications to load the complied template definitions without requiring such other applications to make multiple passes over the above-mentioned output list while loading.

The invention operates to verify that no template refers to any other template for which a definition is not provided in the above-listed rules of the GDMO language.

The invention then linearizes, or orders, the template references by building an output list of the templates using a unique method or process.

The invention operates to detect errors in GDMO definitions at compile time, rather than at execution time as in prior arrangements. This feature of the invention simplifies execution time error handling significantly. Also, having the templates linearized in the compiler output list, as is provided by the invention, provides significant execution time simplification to all programs that must load and process the complied GDMO definitions contained in the compiled output file.

These and other objects, advantages, and features of the invention will be apparent to those of skill in the art upon reference to the following detailed description of the invention, which description makes reference to the drawing.

DESCRIPTION OF THE PREFERRED EMBODIMENT

Figure 1:
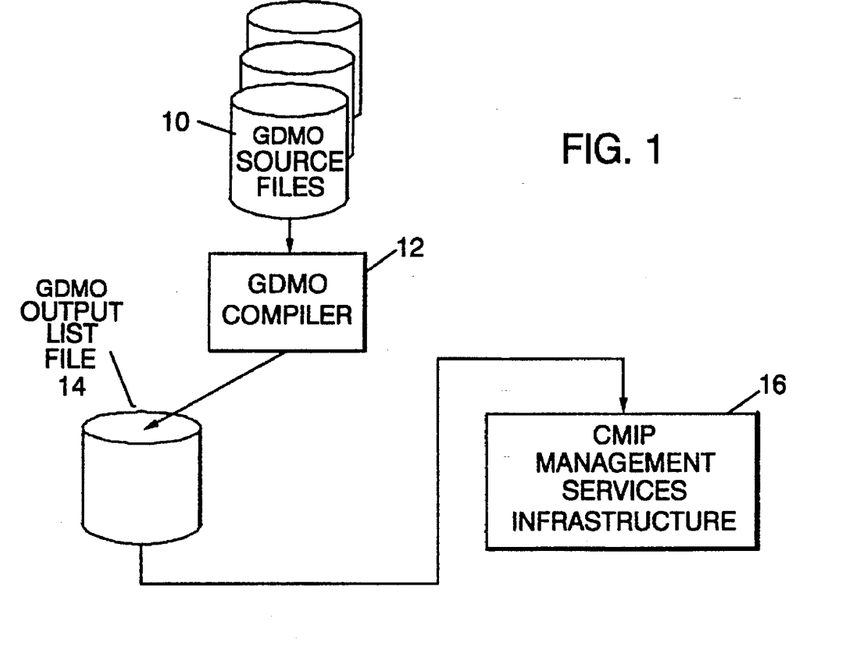
FIG. 1 shows a GDMO compiler that operates to provide a GDMO output list file, to thereby define managed objects, and the protocol flow between managed objects, to a CMIP management services infrastructure.

FIG. 1 shows the data flow that operates to build and then output a GDMO output list file 14 to CMIP management services infrastructure 16. Templates supplied from GDMO source files 10 are provided to GDMO compiler 12. GDMO compiler 12 builds and outputs GDMO output list file 14, which file 14 is then loaded into CMIP infrastructure 16.

The present invention relates to compiler 12 that is written to compile the GDMO language. This invention performs two functions simultaneously, and thereby solves two problems that are associated with the definition of GDMO hierarchy structure. First, the invention checks the inheritance structure for correctness; i.e., checks to ensure that the three required GDMO properties of Acyclic, Connected, and Single-source are met by the inheritance structure being checked. Second, the invention provides a complete ordering or linearization of the templates in the output list of compiler 12. This complete ordering includes an ordering of not only the class templates, but also includes the ordering of all other types of GDMO templates.

The GDMO language is specified in *CCITT Recommendation X.722* (1992) or *ISO/IEC* 10165-4:1992, "Information Technology - Open Systems Interconnection - Management Information Services - Structure of Management Information: Guidelines for the Definition of Managed Objects."

As used herein, the terms input list and output list are intended to contain linked list data structures, well known to those of skill in the art.

Figure 2:
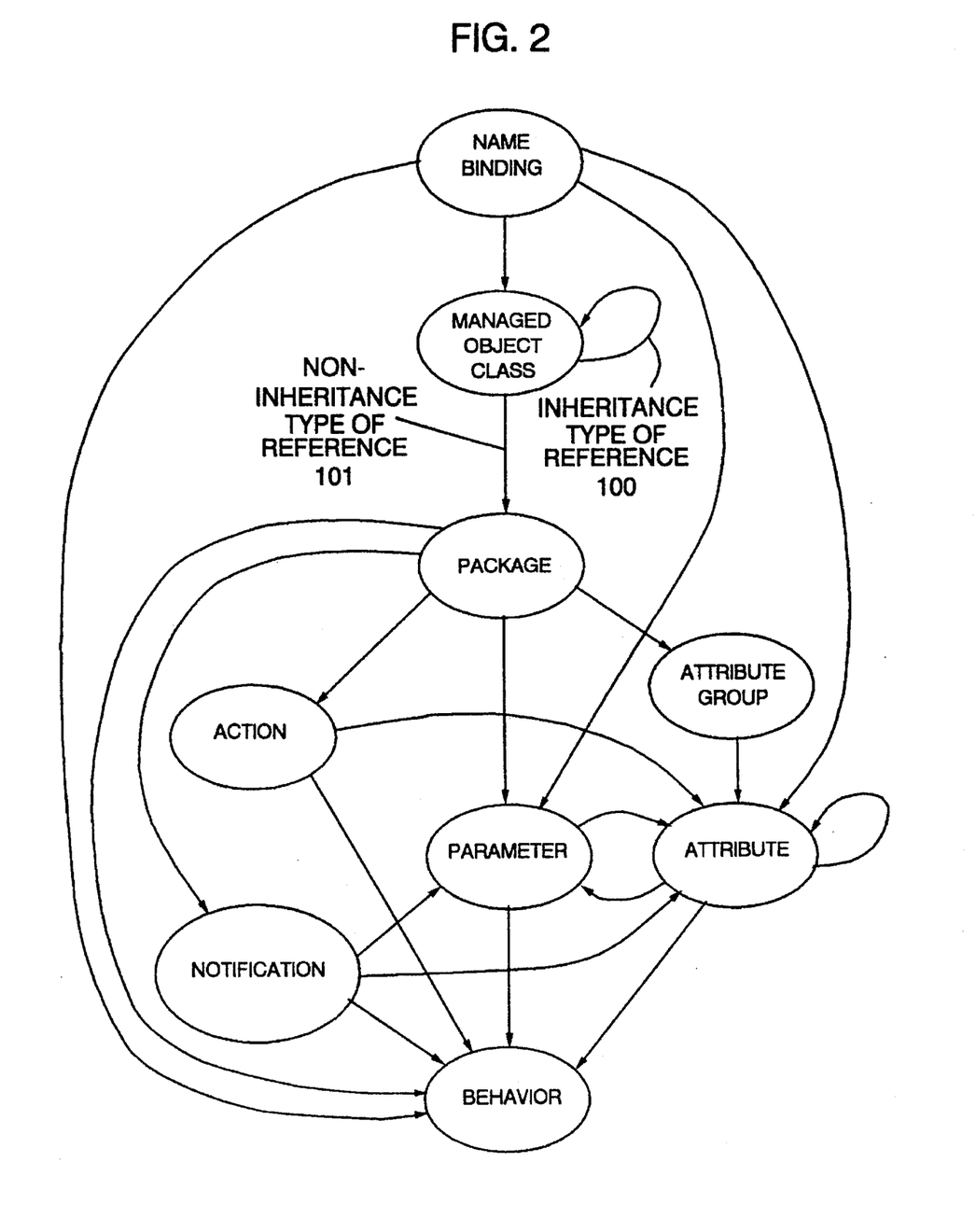
FIG. 2 is a pictorial representation showing the GDMO language rules that define GDMO template type referencing.

As stated previously, the GDMO language specifies which template types may reference other template types. The invention uses the following known rules of the GDMO language to linearize or order template references (also see FIG. 2 for a pictorial representation of these rules);

Managed Object Class templates may reference only Package templates and other Managed Object Class templates, Package templates may reference only Behaviour, Parameter, Attribute, Attribute Group, Action and Notification templates, Parameter templates may reference only Behaviour and Attribute templates, Name Binding templates may reference only Managed Object Class, Attribute, Parameter and Behaviour templates, Attribute templates may reference only Behaviour, Parameter and other Attribute templates, Attribute Group templates may reference only Attribute templates, Behaviour templates cannot reference other templates, Action templates may reference only Behaviour, Attribute and Parameter templates, Notification templates may reference only Behaviour, Attribute and Parameter templates, and Cycles among template references are not allowed.

In FIG. 2, two types of referencing are identified. The first is an inheritance type of reference 100, the second is a non-inheritance type of reference 101. Both type of reference will be identified by the single term reference herein.

Figure 5:
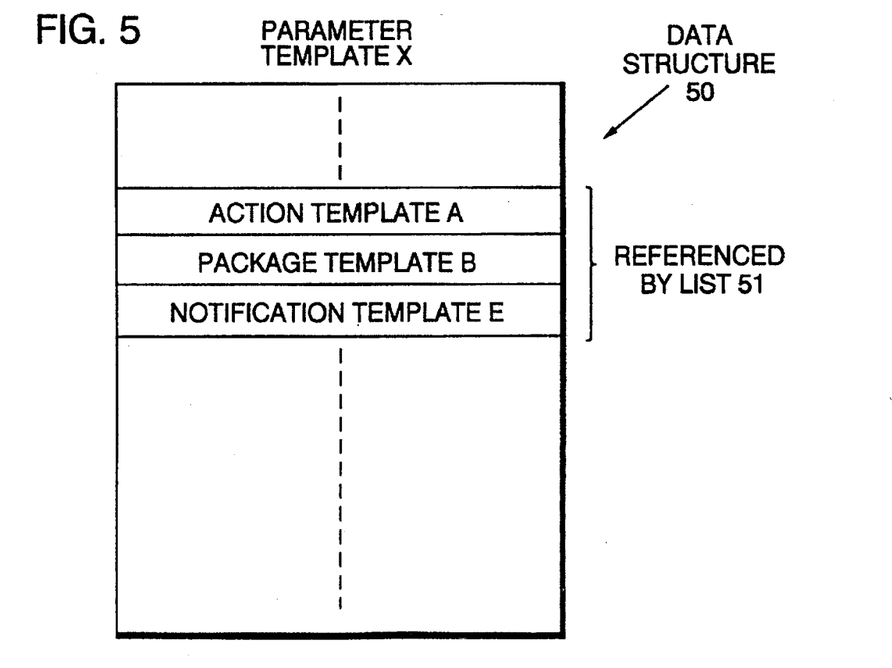
FIG. 5 is a pictorial representation of the data structure of a GDMO template showing a portion of that data structure that defines which other templates refer to the template shown in FIG. 5, this portion being called the referenced-by list.

FIG. 5 is a simplified showing of the data structure 50 of an exemplary Parameter template that has been arbitrarily identified as "Parameter template X". The data structure of each of the types of templates shown in FIG. 2, with the exception of Name Binding templates, contains a "referenced-by" list 51 that lists which other templates reference the template. In the example of FIG. 5, the referenced-by list for Parameter template X lists Action template A, Package template B, and Notification template E.

The invention operates to verify that no template refers to any other template for which reference is not provided in the above-listed rules of the GDMO language. When FIG. 5 is compared to FIG. 2, it is seen that these rules have been followed for Parameter template X.

The invention then linearizes the definitions of the templates in the output list so that none of the template references are forward references.

Figure 3:
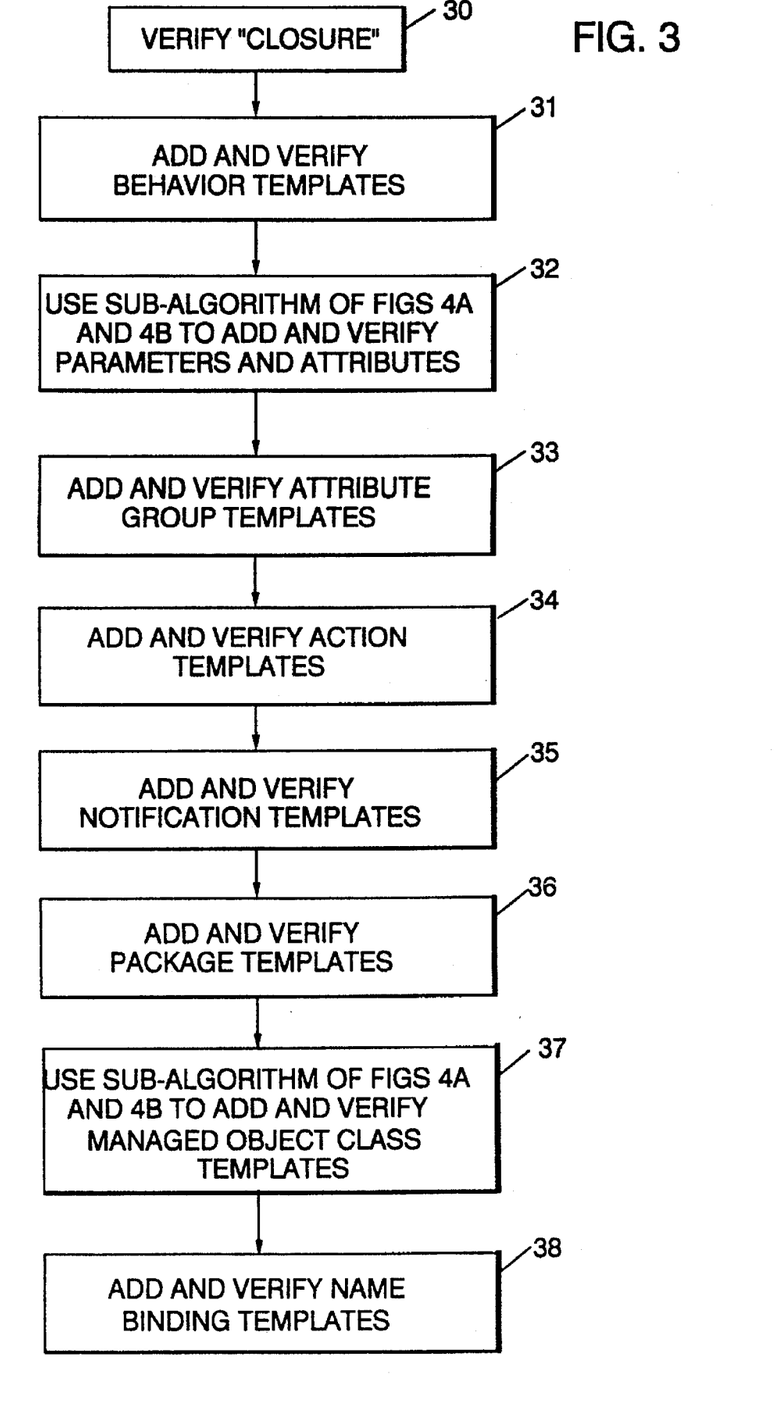
FIG. 3 is a pictorial logic representation showing the method by which the invention linearizes or orders references to templates of the type shown in FIG. 2 by building the FIG. 6 output list of templates in a unique manner.

Step 30 of the process of FIG. 3, containing the legend verify "closure", operates to ensure that a complete input list exists. That is, the templates that are listed in all reference-by lists do, in fact, exist in the input list. The FIG. 5 referenced-by list 51 of each template in the input list is used to perform this function.

Step 31 of the process verifies and then adds all Behaviour templates to the output list, the order in which the Behaviour templates are added to the output list being immaterial since none of the Behaviour templates refer to other templates, as shown in FIG. 2.

Figure 4A:
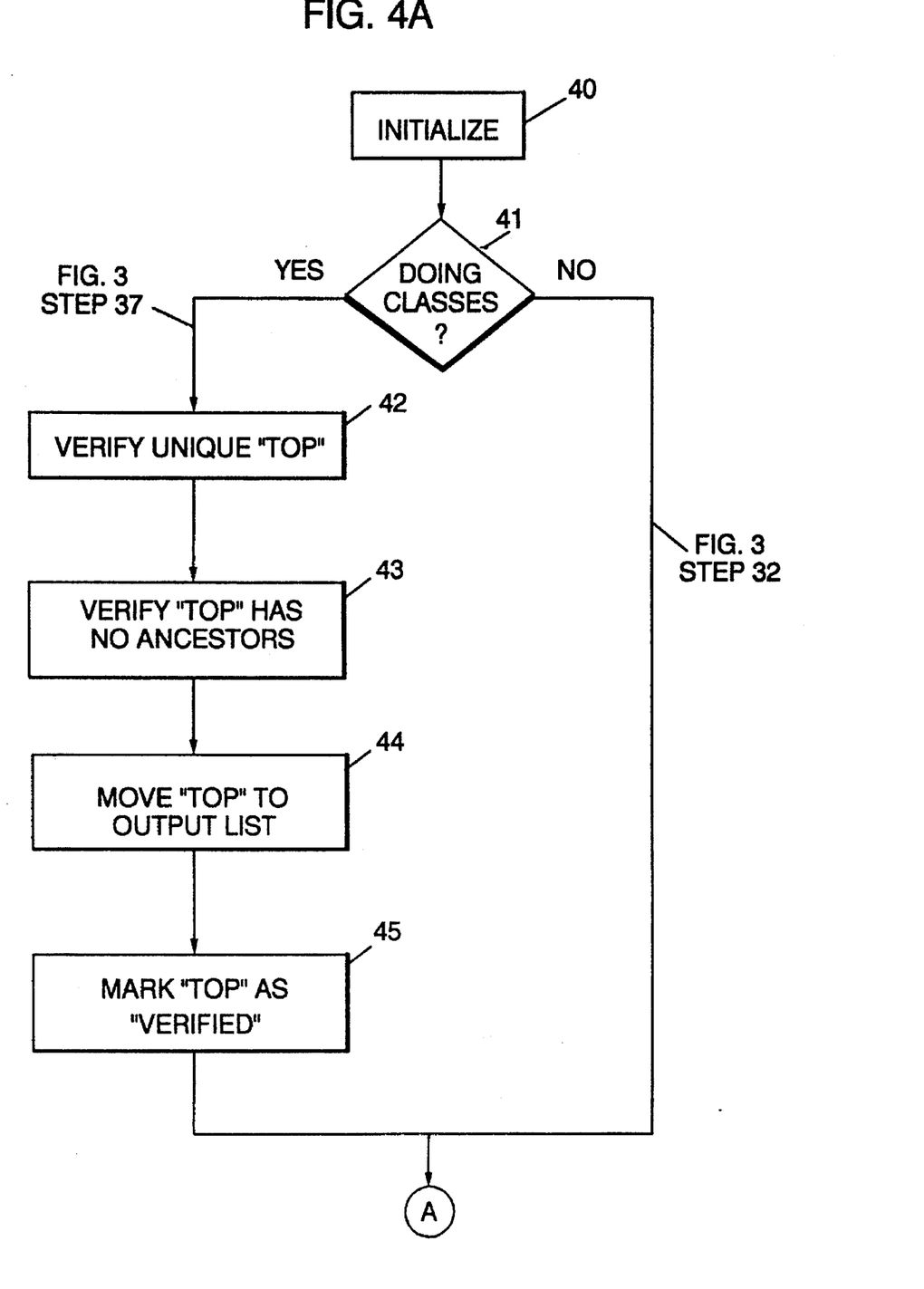
FIGS. 4A and 4B show the invention's sub-algorithm logic process that is used in steps 32 and 37 of FIG. 3 to first add Parameters and Attributes templates, and then to add Managed Object Class templates to the output list of FIG. 6.
Figure 4B:
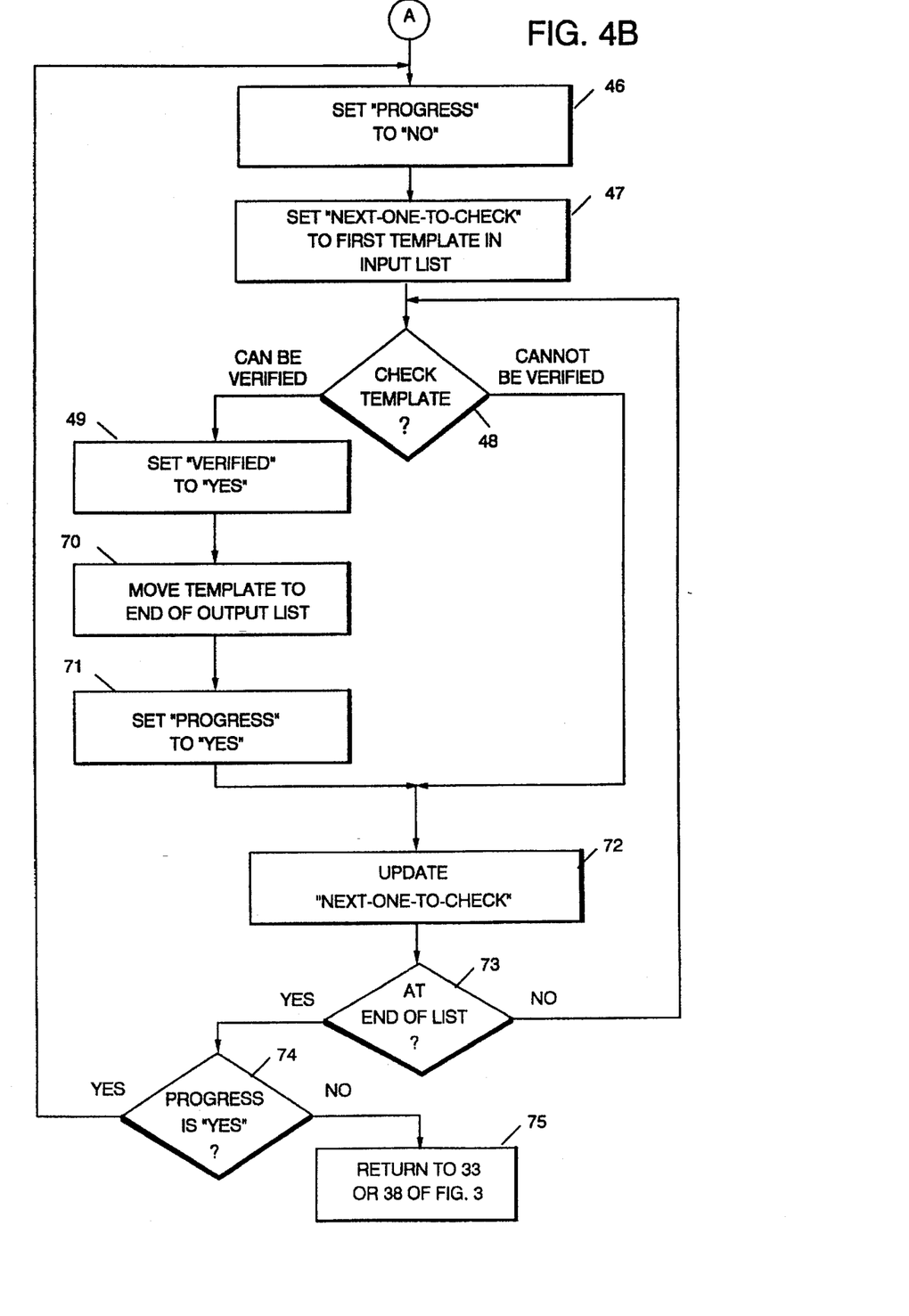

Step 32 of the process now uses the sub-algorithm of FIGS. 4A and 4B (to be described) to first verify and then add the Attribute and Parameter templates to the output list in an intermixed order such that no Attribute, or Parameter template, refers to any other Attribute or Parameter template that has not previously been placed on the list; i.e., no forward referencing exists. Note from FIG. 2 that no check of reference to Behaviour templates is required since all Behaviour templates are already verified and on the output list.

In step 33 of the process, all Attribute Group templates are verified and then added to the output list, the order in which these templates are added being immaterial because Attribute Group templates reference only already added Attribute templates, as shown in FIG. 2.

In step 34 of the process, all Action templates are verified and then added to the list, in step 35 all Notification templates are verified and added to the output list, and in step 36 all Package templates are verified and added to the list.

Note that the order in which Action, Notification and Attribute Group templates are added to the output list is not critical since inheritance of one of these templates is assured in previously added templates, as shown by FIG. 2.

Step 37 of the process verifies and adds all Managed Object Class templates to the output list in a mixed order, using the sub-algorithm of FIGS. 4A and 4B (to be described) to add the Managed Object Class templets in such a manner that no Managed Object Class template refers to another Managed Object Class template that has not previously been added to the list by operation of FIGS. 4A and 4B, and by operation of this step 37. No check of reference to Package templates is required since all Package templates are already on the list by operation of step 36.

Finally, in step 38, all Name Binding templates are verified and added to the output list.

Figure 6:
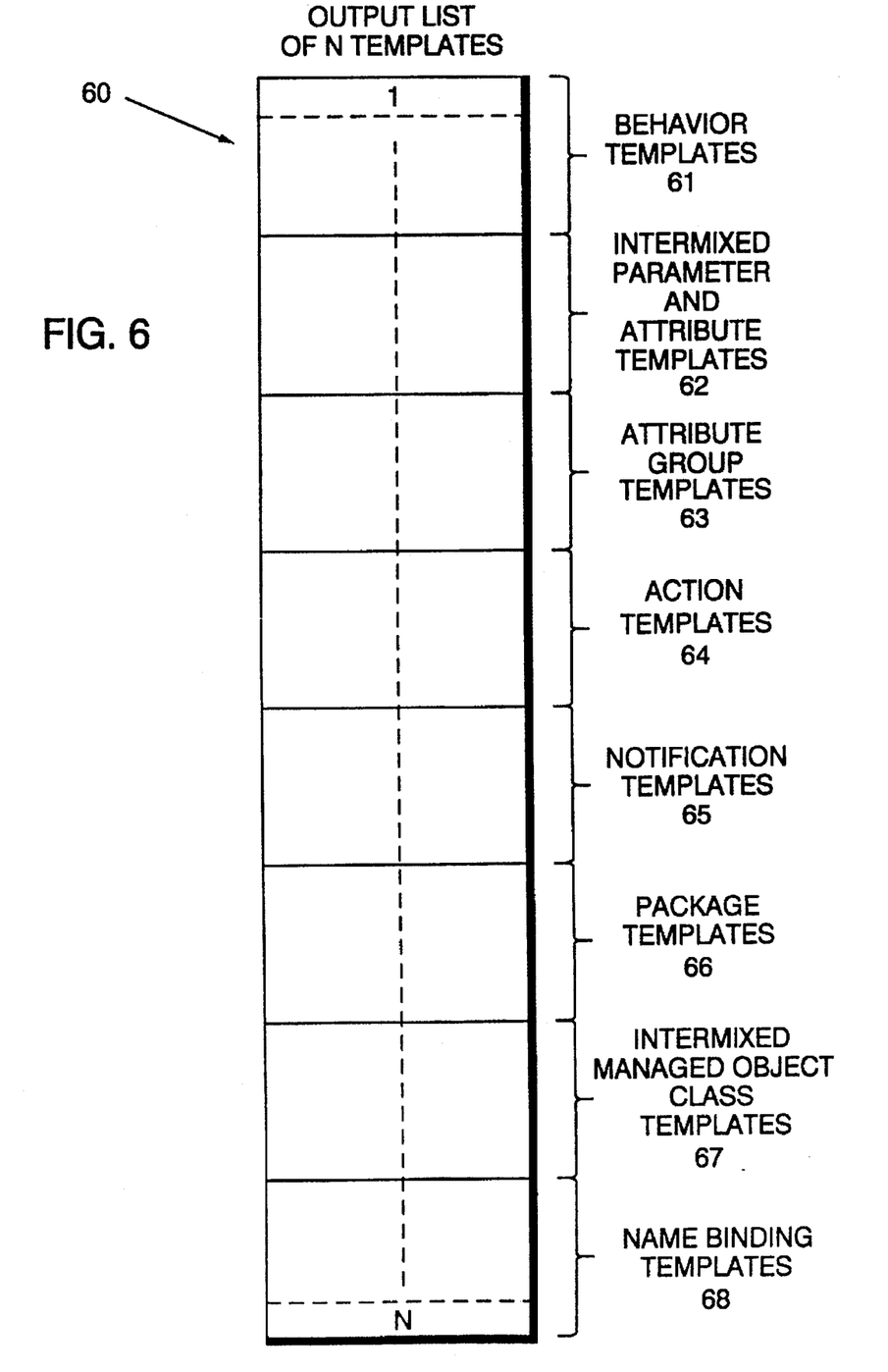
FIG. 6 is a pictorial representation of the verified and ordered compiler output list of the GDMO compiler of FIG. 1 as is provided by the present invention.

FIG. 6 shows such an exemplary output list 60 comprising the total number N templates. The first template in the list is Behavior template 1, and the last template in the list is Name Binding template N. The group of Behaviour templates, identified as 61, result from step 31 of FIG. 3. The intermixed group of Parameter and Attribute templates identified as 62 result from step 32 of FIG. 3. The group of Attribute Group templates identified as 63 result from step 33 of FIG. 3. The group of Action templates identified as 64 result from step 34 of FIG. 3. The group of Notification templates identified as 65 result from step 35 of FIG. 3. The group of Package templates identified as 66 result from step 36 of FIG. 3. The intermixed group of Managed Object Class Attribute templates identified as 67 result from step 37 of FIG. 3. The group of Name Binding templates identified as 68 result from step 38 of FIG. 3.

As mentioned above, a sub-algorithm of the invention is used in Parameter and Attribute adding step 32, and in Managed Object Class template adding step 37 of the above-described nine-step procedure for ordering or linearizing the template references to thereby build an ordered output list of templates as shown in FIG. 6. While not critical to the invention, FIG. 6 assumes that all nine possible types of templates were in fact in the input list. This sub-algorithm, which takes a list of templates as input and produces the verified and ordered template list of FIG. 6 as output, can be used to generate full ordering from any partial ordering with an algorithmic complexity of n-squared.

With reference to FIG. 3, step 31 thereof operates to first verify and move all input list Behaviour templates to the output list shown in FIG. 6. In this step 31, all "verified" variables for the Behaviour templates are set to "yes". After step 31 has been completed, the sub-algorithm of FIGS. 4A and 4B is used to perform step 32 of FIG. 3. As noted in FIG. 4A, since Parameter and Attribute templates are being processed in FIG. 3's step 32, decision block 41 branches to function box 46 of FIG. 4B.

This FIG. 4A and 4B sub-algorithm makes use of a number of control flags that are contained in three control variables that are set as the sub-algorithm executes. These control flags control execution of the sub-algorithm and are named "progress", "next-one-to-check" and "verified".

A single control variable named "progress" is used in the loop of the sub-algorithm shown in FIG. 4B. This variable "progress" has only the two allowable states, "yes" and "no". A "yes" condition of the control variable "progress" indicates that at least one template has been verified and moved to the output list during the current cycle of the sub-program, while a "no" state of this variable indicates that no parameter has been verified and moved to the output list; i.e., that the end of the Parameter template and Attribute template input list has been reached (i.e., the end of step 32 of FIG. 3), or that the end of the Managed Object Class template input list has been reached.

A single control variable named "next-one-to-check" is used to indicate which one of the templates in the Parameter and Attribute template input list, or the Managed Object Class input list, is the next template to be considered for verification. The variable "next-one-to-check" is also used in the loop of the sub-algorithm shown in FIG. 4B.

A set of control variables are named "verified". There is one distinct control variable "verified" for each template that is in the input list; i.e., if the input list contains twelve templates, twelve "verified" control variables exist. The control variables "verified" having only two states, "yes" and "no". It should be noted that in steps 31, 33, 34, 35, 36 and 38 of FIG. 3, the process thereof operates to set the control variable "verified" to "yes" as each of the specified templates is moved to the output list.

As shown in step 40 of the sub-algorithm of FIG. 4A, initially, all control variables "verified" for either the Parameter and Attribute templates (step 31 of FIG. 3), or for the Managed Object Class templates (step 37 of FIG. 3), are set to "no". As a Parameter, Attribute or Managed Object Class template is verified and moved to the output list, its control variable "verified" is set to "yes" at step 49 of FIG. 4B.

The FIGS. 4A and 4B sub-algorithm of the invention contains the following sequential steps. In step 40, the Parameter and Attribute template portion 62 of the compiler output list of FIG. 6 is initialized to be empty (note that if process step 37 of FIG. 3 was being performed, the Managed Object Class template portion 67 of the compiler output list of FIG. 6 is initialized to be empty by operation of step 40).

In addition, all of the above-mentioned "verified" control variables for all Parameter and Attribute templates in the input list (i.e., one control variable "verified" for each template that is in the input list) are set to "no" by operation of step 40 (note that if process step 37 of FIG. 3 was being performed, the "verified" control variables of all Managed Object Class templates in the input list are set to "no" by operation of step 40). Step 40 also ensures that all templates that are required by the template references that are specified by the Parameter, Attribute, and Managed Object Class templates in the input list are in fact currently in the input list.

Following step 40, and if an Attribute template or a Parameter template in the input list is being processed as in step 32 of FIG. 3, the process branches to step 46 of FIG. 4B.

At this point in the description of the invention, the process is working on the Attribute and Parameter input list, and this function 46 of FIG. 4B is enabled. In step 46, the "progress" control variable of each Attribute and Parameter template is set to "no" to indicate that no template has been moved to the output list by the current cycle of the sub-algorithm process.

In process step 47, the "next-one-to-check" control variable is set to identify the next template in the input list that should be checked, this next template being the first template for the first cycle of the process.

In step 48, the template that was indicated in step 47 is checked to determine if this template can be verified; i.e., the step 47 templates is checked to determine if all other templates that are referenced by the reference-by portion 51 of the step 47 template have their "verified" control variable set to "yes". If all such referenced templates have their "verified" control variable set to "yes", then the step 47 template can be verified. If all such referenced templates do not have their "verified" control variable set to "yes", then the step 47 template cannot be verified, and step 73 of the FIG. 4B process is enabled.

Assuming that the step 47 template can be verified, then step, or function box 49, sets that template's "verified" control variable to "yes", step 70 removes the step 47 template from the input list and adds that template to the end of the output list, and step 71 sets the "progress" control variable to "yes" to indicate that at least one template was verified during this cycle over the input list.

In step 72, the "next-one-to-check" control point variable is set to point to the next Parameter or Attribute template in the input list.

Step 73 determines if all Parameter and Attribute templates in the input list have been checked. If "no", the process of FIG. 4B returns to above-described step 48. If "yes", the process branches to function box 74 that operates to examine the "progress" control variable to determine if it is set to "yes"; i.e., to determine if any templates have been verified during this cycle. If "yes", the process returns to above-described step 46 to repeat the process starting at the first template in the input list. If "no", then the process goes to step 75.

In step 75, if there are any Parameter or Attribute templates remaining in the input list currently being linearized, then those remaining templates are in error, and cannot be linearized. If any such remaining templates do exist, then error messages are issued for those templates. If no templates remain in the input list, then all Parameter and Attribute templates have been verified and moved to the output list in a linearized fashion; i.e., portion 62 of FIG. 6 has been assembled in accordance with the invention. The process now returns to function box or step 33 of FIG. 3.

The process of the invention now operates to perform functions 33, 34, 35 and 36 of FIG. 3, thereby forming the FIG. 6 portions 63, 64, 65 and 67 of the FIG. 6 output list.

Returning now to the sub-algorithm of FIGS. 4A and 4B for operation of step 37 of FIG. 3, this time the above-described decision block 41 determines that the input list being processed consists of Managed Object Class templates, and function box 42 is enabled. Function box or step 42 operates to verify that the input list contains a unique Managed Object Class templates identified or named "top". In accordance with the GDMO language rules, one and only one such Managed Object Class may exist, and it cannot reference any other Managed Object Class template. This latter property is verified in step 44. If steps 42 and 43 are not verified, an error message is issued, the process stops, and an output list is not produced.

Assuming that steps 42 and 43 provide proper verification, then step 44 moves the template named "top" to the top of the portion 67 of the FIG. 6 output list, and step 45 marks this template as verified; i.e., sets its "verified" control variable to "yes".

The process now branches to step 46 of FIG. 4B. The procedure by which the sub-algorithm of FIG. 4B operates to process Managed Object Class templates is much as described above relative to the FIG. 3 step 32 Parameter and Attribute templates, with the exception that step 75 of FIG. 4B returns to step 38 of FIG. 3 when all Managed Object Class templates have been verified and moved to the portion 67 of the FIG. 6 output list.

The above-described invention operates to detect errors in GDMO definitions at compile time rather than at execution time, as in prior arrangements. This feature of the invention simplifies execution time error handling significantly. Also, having the templates linearized in the compiler output list of FIG. 6, as is provided by the invention, provides significant execution time simplification to all programs that must load and process the complied GDMO definitions contained in the compiled output file.

Figure 7:
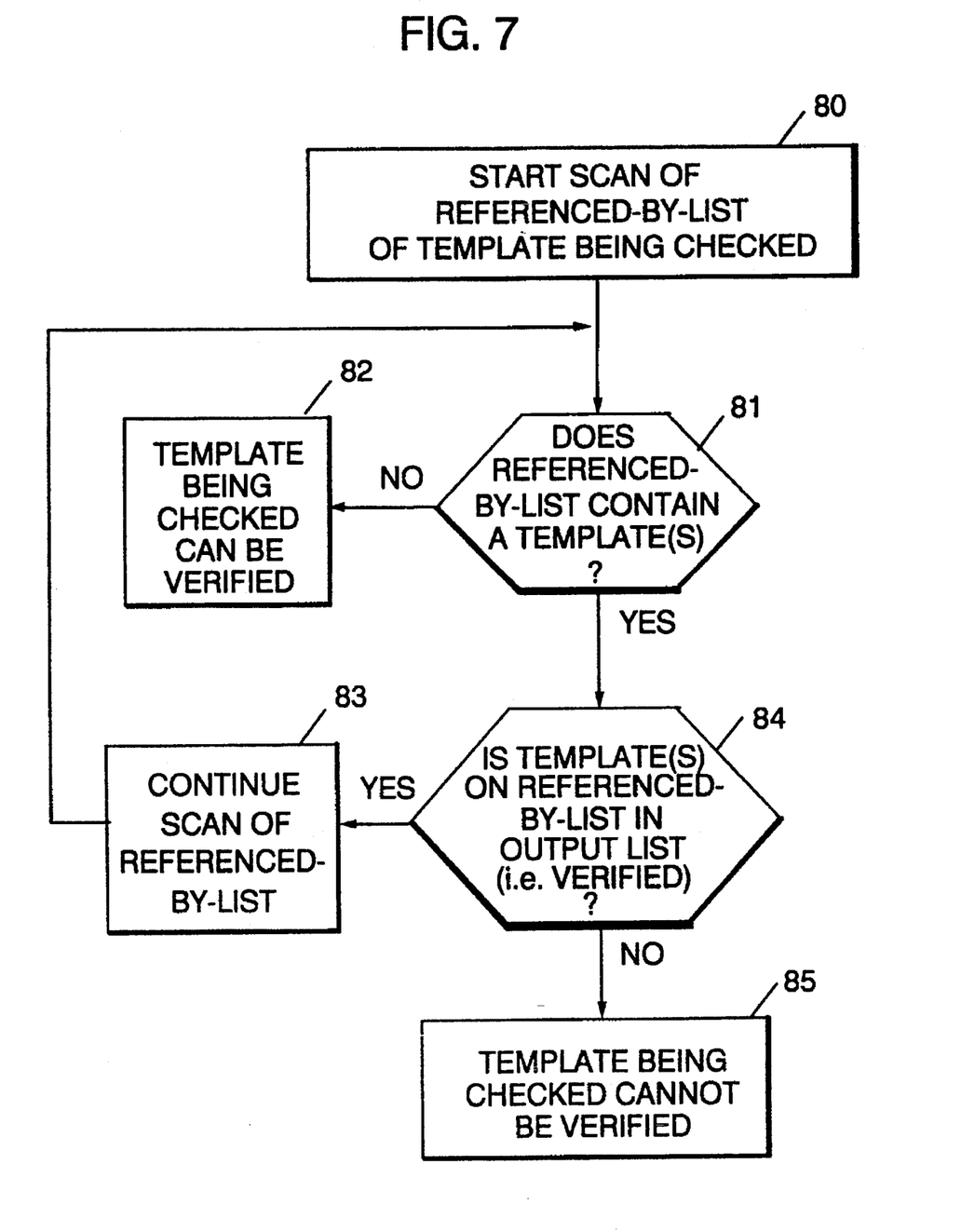
FIG. 7 shows a logic implementation of function box 48 of FIG. 4B.

FIG. 7 shows the logic process of decision box 48 of FIG. 4B in greater detail. While the logic process of box 48 can be implemented in a number of ways, FIG. 7 is a nonlimiting example. At function box 80, a scan of the referenced-by list (see 51 of FIG. 5) of the template being checked begins. Remember that for step 32 of FIG. 3 the template being checked is a Behaviour template, or an Attribute template, and for step 37 of FIG. 3 the template being checked is a Managed Object Class template.

Decision box 71 now determines if a template has been found in this referenced-by list. If the template being checked does not list a template in its referenced-by list, the template being checked can be verified, as is indicated at 82, and the sub-algorithm process of FIG. 4B continues at function box 49.

If the template being checked does in fact contain at least one template in its referenced-by list, then decision box 84 is enabled to determine if the listed template is in the output list; i.e., if the listed template has been verified. If the listed template has been verified, then function box 83 is enabled to continue scan of the referenced-by list of the template that is being checked.

If the listed template has not been verified, then function box 85 is enabled to indicate that the template being checked cannot be verified, and the sub-algorithm process proceeds with function box 72 of FIG. 4B.

Assuming that the template being checked does in fact contain one or more templates in its referenced-by list, and that these templates have all been verified, when cyclic operation of boxes 83, 81 and 84 reaches the end of the referenced-by list, the "no" output of decision box 81 enables function box 82, and the sub-algorithm proceeds to function box 49 of FIG. 4B, thereby verifying the template being checked.

With reference to FIG. 2, the various GDMO parameters can be grouped as follows.

Group-A templates are templates that cannot reference any other GDMO templates. The following templates are in Group-A.
  Behaviour templates cannot reference other GDMO templates.

Group-B templates are templates that can reference only defined other GDMO templates. The following templates are in Group-B.
  Package templates can reference only Attribute Group, Parameter, Action, Notification, and Behaviour templates.
  Action templates can reference only Attribute, Parameter, and Behaviour templates.
  Attribute Group templates can reference only Attribute templates.
  Notification templates can reference only Parameter, Attribute, and Behaviour templates.

Group-C templates are templates that can reference only defined other GDMO templates, and can also reference templates of its own Group-C. The following templates are in Group-C.
  Managed Object Class templates can reference Package templates, and can also reference other Managed Object Class templates.

Group-D templates are templates that can reference certain other GDMO templates, and can also be referenced by a template to whom it is allowed to reference. The following templates are in Group-D.
  Parameter templates can reference Behaviour and Attribute templates, and can also be referenced by Attribute templates.

Group-E templates are templates that can reference certain other GDMO templates, can also be referenced by a template to whom it is allowed to reference, and can also reference templates of its own Group-E. The following templates are in Group-E.
  Attribute templates can reference only Behaviour and Parameter templates, can be referenced by Parameter templates, and can also reference other Attribute templates.

Group-F templates are templates that can reference certain other GDMO templates, can also reference templates of Group-C, can also reference templates of Group-D, and can also reference templates of Group-E. The following templates are in Group-F.
  Name Binding templates can reference only Behaviour templates, can also reference Managed Object Class templates of Group-C, can also reference Parameter templates of Group-D, and can also reference Attribute templates of Group-E.

In accordance with the invention, a process is provided for generating the reference or inheritance ordered GDMO template output list of FIG. 6 from a GDMO template input list wherein the input list contains a number of templates that may include the above-defined Group-A, Group-B, Group-C, Group-D, Group-E and Group-F templates.

More specifically, the invention provides that Group-A templates 61 of FIG. 6 be first placed on the output list. Next, the Group-D and Group-E templates are placed on the output list of FIG. 6 in an intermixed manner 62 that insures that each individual template of Group-D, and Group-E occupies a position in intermix 62 such that forward referencing does not occur.

Group-B templates are now placed on the output list of FIG. 6 in a manner that insures that each individual template of the Group-B templates occupies a position in the output list that satisfy the template's reference requirements; i.e., such that all templates that are referenced by an individual template proceed the individual template in the output list.

Group-C templates are now placed on the output list, again in a manner that insures that each individual template of Group-C occupies a position in the output list such that all templates that are referenced by an individual template precedes the individual template in the output list.

As a last step, Group-F templates are placed on the output list.

Of course, as shown at 30 in FIG. 3, prior to building the output list of FIG. 6, a verification procedure insures that all GDMO templates that are specified by template referenced-by lists are in the input list.

While the invention has been described while making reference to preferred embodiments thereof, it is known that others skilled in the art will readily visualize yet other embodiments that are within the spirit and scope of the invention. Thus, the above detailed description should not be taken as a limitation on the invention.

What is claimed is:

1. In a computer-related data processing method for generating a reference ordered GDMO template output list from an input that comprises a GDMO template input list, said input list containing groups of templates including Group-A templates that cannot reference any other GDMO templates, Group-B templates that can reference other GDMO templates, Group-C templates that can reference other GDMO templates and can also reference templates of its own Group-C, Group-D templates that can reference other GDMO templates and can also be referenced by a template to whom it is allowed to reference, Group-E templates that can reference other GDMO templates and can also be referenced by a template to whom it is allowed to reference and can also reference templates of its own Group-E, and Group-F templates that can reference other GDMO templates can also reference templates of Group-C Group-D and Group-E, the method comprising the sequential data processing steps of;

placing said Group-A templates from said input list on said output list, placing said Group-D and Group-E templates from said input list on said output list in an intermixed manner that insures that each individual template of said Group-D and Group-E templates occupies a position on said output list such that all templates that are referenced by each said individual template precedes each said individual template in said output list, placing said Group-B templates from said input list on said output list in a manner that insures that each individual template of said Group-B templates occupies a position on said output list such that all templates that are referenced by each said individual template precedes each said individual template in said output list, placing said Group-C templates from said input list on said output list in a manner that insures that each individual template of said Group-C templates occupies a position on said output list such that all templates that are referenced by each said individual template precedes each said individual template in said output list, and placing said Group-F templates from said input list on said output list.

2. The computer related method of claim 1 including the data processing step of;

verifying that all reference to GDMO templates that is specified by templates in said input list are satisfied by said templates in said input list prior to said step of placing said Group-A templates on said output list.

3. In a machine-related process for generating an ordered output list of GDMO templates that supports referencing specified by GDMO templates that are contained in an input list, said input list containing GDMO templates that are selected from the GDMO template group Behavior, Parameter, Attribute, Attribute Group, Action, Notification, Package, Managed Object Class, and Name Binding, the machine-related process comprising the sequential steps of;

placing all Behavior templates that are in said input list on said output list, placing all Parameter and Attribute templates that are in said input list on said output list in an intermixed manner that insures that any Parameter or Attribute template that provides reference to another Parameter or Attribute template precedes said another Parameter or Attribute template in said output list, placing all Attribute Group, Action, Notification and Package templates that are in said input list on said output list in a manner that insures that each individual template thereof occupies a position on said output list such that all templates that provide reference to a said template precede said template in said output list, placing all Managed Object Class templates that are in said input list on said output list in a manner that insures that each Managed Object Class template that provides reference to another Managed Object Class template occupies a position on said output list that precedes said another Managed Object Class template in said output list, and placing all Name Binding templates that are in said input list on said output list.

4. The machine-related process of claim 3 including the machine-related step of;

verifying that all specified reference to GDMO templates in said input list is satisfied by said templates in said input list.

5. In a machine-related process for machine-generating an ordered output list of Parameter and Attribute GDMO templates whose order supports Parameter and Attribute template referencing that is specified by the Parameter and Attribute templates that are listed in an input list, wherein said Parameter and Attribute templates in said input list may reference each other, and wherein any individual Attribute template in said input list may reference another Attribute template in said input list, the process comprising the sequential step of;

fetching a Parameter or Attribute template from said input list, reference checking to determine if the referencing that is specified by said fetched template can be satisfied by templates that are on said output list, if said referencing cannot be satisfied, fetch another template from said input list, and repeat said reference checking step, if said referencing can be satisfied, moving said fetched template from said input list to said output list, fetching another Parameter or Attribute template from said input list, and repeat said reference checking step, and repeating said process until all templates in said input list have been moved from said input list to said output list.

6. The machine-related process of claim 5 including the steps of;

setting a flag each time a template is moved to said output list, determining if all of the templates in said input list have been fetched in the absence or presence of a set flag, if all of the templates in said input list have been fetched in the absence of a set flag, fetching another template from said input list and repeating said referencing checking step, and if all of the templates in said input list have been fetched in the presence of a set flag, ending said process.

7. The machine-related process of claim 5 including the step of indicating an error when a templet exists on said input list for which referencing cannot be satisfied.

8. In a computer-related process for computer-generating an ordered output list of Managed Object Class GDMO templates whose order supports a Managed Object Class template referencing that is specified by the Managed Object Class templates that are in an input list that is supplied an input to the computer-related process, wherein said Managed Object Class templates in said input list may reference another Managed Object Class template in said input list, the process comprising the sequential computer-related steps of;

finding a Managed Object Class named Top in said input list, moving said Managed Object Class named Top from said input list to said output list, fetching a template from said input list, reference checking to determine if the referencing that is required by said fetched template can be satisfied by templates that are on said output list, if said referencing cannot be satisfied, fetching another template from said input list, and repeating said reference checking step, if said referencing can be satisfied, moving said fetched template from said input list to said output list, fetching another template from said input list, and repeat said reference checking step, and repeating said computer-related process until all templates in said input list have been moved to said output list.

9. The computer-related process of claim 8 including the computer-related steps of;

setting a flag each time a template is moved to said output list, determining if all of the templates in said input list have been fetched in the absence or presence of a set flag, if all of the templates in said input list have been fetched in the absence of a set flag, fetching another template from said input list and repeating said reference checking step, and if all of the templates in said input list have been fetched in the presence of a set flag, ending said computer-related process.

10. The computer-related process of claim 9 including the step of indicating an error when templates exist on said input list for which referencing cannot be satisfied.

11. The computer-related process of claim 8 including the computer-related step of indicating an error upon failure to find a Managed Object Class named Top in said input list.

12. In a machine-related process for machine-generating an ordered output list of GDMO templates whose order supports template referencing that is specified by the templates that are listed in an input list, wherein said templates in said input list may reference another template in said input list, the process comprising the sequential steps of;

fetching a template from said input list, reference checking to determine if the referencing that is required by said fetched template can be satisfied by templates that are on said output list, if said referencing cannot be satisfied, fetching another template from said input list, and repeating said reference checking step, if said referencing can be satisfied, moving said fetched template from said input list to said output list, fetching another template from said input list, and repeating said reference checking step, and repeating said process until all templates in said input list have been moved to said output list.

13. The machine-related process of claim 12 including the steps of;

setting a flag each time a template is moved to said output list, determining when all of the templates in said input list have been fetched, when all of the templates in said input list have been fetched in the absence of a set flag, fetching another template from said input list and repeating said reference checking step, and when all of the templates in said input list have been fetched in the presence of a set flag, ending said process.

14. The machine-related process of claim 12 including the step of indicating an error when at least one template exists on said input list for which referencing cannot be satisfied.

15. In a computer-related GDMO-process for computer-generating a reference-ordered GDMO-template output-list from a GDMO-template input-list that is not reference-ordered, comprising the steps of;

checking each individual input-list GDMO-template to determine GDMO-referencing specified therein, and placing each of said individual input-list GDMO-templates in said output-list in a reference-order such that each of said individual output-list GDMO-templates is preceded in said output-list by GDMO-templates that are GDMO-referenced therein.

16. The computer-related GDMO-process of claim 15 including the step of;

verifying that all GDMO-referencing that is specified by said input-list GDMO-templates can be satisfied by said input-list GDMO-templates prior to said placing step, and indicating an error when said verifying step has determined that all GDMO-referencing specified by said input-list GDMO-templates can not be satisfied by said input-list GDMO-templates.

* * * * *